United States Patent
Sun et al.

(10) Patent No.: US 7,879,752 B2
(45) Date of Patent: Feb. 1, 2011

(54) ELECTROCATALYST

(75) Inventors: Gongquan Sun, Liaoning (CN); Qin Xin, Liaoning (CN); Juan Tian, Liaoning (CN); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 11/832,334

(22) Filed: Aug. 1, 2007

(65) Prior Publication Data
US 2008/0050640 A1   Feb. 28, 2008

Related U.S. Application Data

(60) Provisional application No. 60/822,122, filed on Aug. 11, 2006.

(51) Int. Cl.
| H01M 4/02 | (2006.01) |
| H01M 4/36 | (2006.01) |
| H01M 4/92 | (2006.01) |
| H01M 4/94 | (2006.01) |
| H01M 4/90 | (2006.01) |
| H01M 4/88 | (2006.01) |
| B01J 21/18 | (2006.01) |
| B01J 23/00 | (2006.01) |
| B01J 23/40 | (2006.01) |
| B01J 23/74 | (2006.01) |

(52) U.S. Cl. .............. 502/185; 502/101; 502/180; 502/182; 429/523; 429/524; 429/525; 429/526; 429/527; 429/528

(58) Field of Classification Search .............. 502/101, 502/180, 182, 185; 429/40–44, 523–528
See application file for complete search history.

(56) References Cited

U.S. PATENT DOCUMENTS

| 3,055,840 | A | * | 9/1962 | Koch, Jr. ............... 502/174 |
| 3,282,738 | A | * | 11/1966 | Langer et al. .......... 502/101 |
| 5,013,618 | A | * | 5/1991 | Luczak .................. 429/44 |
| 5,024,905 | A | * | 6/1991 | Itoh et al. .............. 429/44 |
| 5,068,161 | A | * | 11/1991 | Keck et al. ............. 429/44 |
| 5,151,515 | A | * | 9/1992 | Cisar ..................... 546/12 |
| 5,998,328 | A | * | 12/1999 | Dawes et al. .......... 502/182 |
| 6,391,486 | B1 | * | 5/2002 | Narayanan et al. .... 429/40 |
| 6,670,300 | B2 | * | 12/2003 | Werpy et al. .......... 502/182 |
| 6,946,211 | B1 | * | 9/2005 | Bjerrum et al. ....... 429/33 |
| 7,001,865 | B2 | * | 2/2006 | Tada et al. ............ 502/185 |
| 2004/0115515 | A1 | * | 6/2004 | Ueda et al. ............ 429/40 |
| 2006/0116285 | A1 | * | 6/2006 | Cao et al. .............. 502/182 |
| 2006/0188775 | A1 | | 8/2006 | Mance et al. |
| 2006/0246344 | A1 | | 11/2006 | Halalay et al. |
| 2006/0264319 | A1 | * | 11/2006 | Yoo et al. .............. 502/101 |
| 2007/0037041 | A1 | | 2/2007 | Cai et al. |
| 2007/0042259 | A1 | * | 2/2007 | Fan et al. .............. 429/40 |

FOREIGN PATENT DOCUMENTS

WO   2004/109829   * 12/2004

* cited by examiner

*Primary Examiner*—Patricia L Hailey
(74) *Attorney, Agent, or Firm*—Reising Ethington P.C.

(57) ABSTRACT

An electrocatalyst including an active catalyst component and an additive including a transitional metal, transitional metal oxide or complex precursor thereof, products including such an electrocatalyst and methods of making and using the same.

14 Claims, 4 Drawing Sheets

Figure 1A
Before the treatment of high temperature reduction

Figure 1B
After the treatment of high temperature reduction

Figure 4A
Before the treatment of high temperature reduction

Figure 4B
After the treatment of high temperature reduction

ELECTROCATALYST

This application claims the benefit of U.S. Provisional Application No. 60/822,122, filed Aug. 11, 2006.

TECHNICAL FIELD

The field to which the disclosure generally relates includes an electrode including an electrocatalyst, products including an electrocatalyst and methods of making and using the same.

BACKGROUND OF THE INVENTION

Electrocatalysts are used in a variety of applications including fuel cells. In a fuel cell with a solid membrane, anode and cathode electrodes are provided over opposite faces of the solid membrane. The electrodes include an electrocatalyst and a binder. Those skilled in the art are continually working to provide alternative embodiments for fuel cell components.

SUMMARY OF THE INVENTION

One embodiment of the invention includes an electrocatalyst including an active catalyst component and an additive including a transition metal or transition metal oxide, complexes including the same or derivatives thereof.

Another embodiment includes an electrocatalyst including an active catalyst component and an additive including titanium or titanium oxide, complexes including the same or derivatives thereof.

Another embodiment of the invention includes a product including a membrane including a first face and a second face, an anode over one of the first face or second face and a cathode over the other of the first face or second face, and wherein at least one of the anode or cathode includes an active catalyst component and an additive including a transition metal or transition metal oxide thereof.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes an electrocatalyst including an active catalyst component and an additive including a transition metal or transition metal oxide, complexes including the same or derivatives thereof.

Another embodiment includes an electrocatalyst including an active catalyst component and an additive including titanium or titanium oxide, complexes including the same or derivatives thereof.

One embodiment of the invention includes an electrocatalyst including an active catalyst component including Pt or PtRu, and an additive including titanium. The atom ratio of platinum to titanium may be 0.01-99, the atom ratio of platinum to ruthenium may be 0.01-99, and the particle diameter of active component may be 1-20 nm.

The above described active catalyst component can be loaded onto the porous electric conductive material, such as carbon particles, modified with the titanium oxides to obtain the supported electrocatalyst, in which the mass percentage of the supported amount of the active catalyst component may be 1-99%. In one embodiment the active catalyst component may include Pt and Ru wherein the atom ratio of platinum to ruthenium may be 0.01-99.

In one embodiment, the active component, the additive component with a mass percentage of 0-99% can be added to form multiple component catalyst. The additive component may include one or more of the transitional metals such as Sc, Ti, V, Cr, Mn, Fe, Co, Ni, Cu, lanthanides, actinides, or transitional metal oxides.

In one embodiment, a carrier material is provided to support the catalyst and may be one or more of the electric conductive macromolecule of activated carbon, carbon nanotube, carbon fiber, mesopore carbon, carbosphere and so on, of which the specific surface area of the carrier material may be 10-2000 $m^2 g^{-1}$.

In one embodiment the additive component may be titanium, titanium oxide, or any organic or inorganic salt compound of titanium.

One embodiment of the invention includes a method for the preparation of the above described electrocatalyst comprising mixing the precursor of titanium with the carrier in the solvent, and which is hydrolyzed to prepare the complex carrier modified with the titanium oxides; wherein the precursor of titanium is various alkoxide and inorganic salts of titanium; absorbing the precursor of the active catalyst component on a complex carrier, which is reduced to prepare the electrocatalyst; wherein the precursor of the active catalyst component comprises a chloride or nitrate; the reducing agent for reduction comprising at least one of ethylene glycol, $H_2$, HCHO, $NaBH_4$, $Na_2S_2O_4$, or HCOOH; placing the obtained electrocatalyst in a tube furnace, treating under a different atmosphere at 300-900° C. for 0.5-10 hours. Alternatively, the additive component of one or more of transitional metals or transitional metal oxides can be added during the absorbing. Adsorption may be multiple step or simultaneous adsorption. The atmosphere may be reductive or inert. The reductive atmosphere may be a mixture gas of $H_2$/Ar, in which the concentration of $H_2$ is 10-90 vol. %. The inert atmosphere may be Ar, $N_2$ or He, etc.

The electrocatalyst may be applied in the proton exchange membrane fuel cells wherein the anode fuel may be hydrogen, synthetic gas, methanol, ethanol or isopropyl alcohol, and the cathode fuel may be oxygen or air.

One embodiment of the invention includes a fuel cell having a solid electrolyte membrane. The membrane includes a first face and an opposite second face. An anode layer may be over one of the first face or second face and a cathode layer may be over the other of the first face or second face. The electrocatalyst may be in one of the anode or cathode layer. The anode and/or cathode may also include a polyelectrolyte (ionomer) such as NAFION®.

In alternative embodiments the electrocatalyst may be supported or non-supported with Pt or PtRu as the major active catalyst component and titanium oxide as an additive component. By the cyclic voltammetry test, the electrochemical active surface area of such a catalytic system is 20-200 $m^2 g^{-1}$ active metal, and the particle diameter of a metal nanometer particle is 1-20 nm using the transmission electron microscope.

In alternative embodiments, the electrocatalyst may be applied to various proton exchange membrane fuel cells, in particular the direct methanol fuel cell and the hydrogen oxygen fuel cell, and in various low temperature proton exchange membrane fuel cells.

In various embodiments, the electrocatalyst may be used in proton exchange membrane fuel cells applied on, for example but not limited to, a submarine, motor vehicle, mobile phone, palm computer, cinematography, or an individual soldier's power supply.

To investigate the electrochemical activities of the catalysts, CO stripping voltammetry was conducted at room temperature in 0.5 M $HClO_4$ by employing the thin porous coating microelectrode technique. The diameter of the glass carbon (GC) electrode was 0.4 cm and the noble metal loading was 0.28 mg $cm^{-2}$. The results of CO stripping voltammetry on these catalysts are listed in Table 1 below. From Table 1, the onset potential of CO oxidation on all samples increased in the following order: PtRu/C-500-H<PtRuTiO$_x$/C-500-H<PtRuTiO$_x$/C<PtRu/C and peak potential: PtRu/C-500-H<PtRu/C<PtRuTiO$_x$/C-500-H<PtRuTiO$_x$/C. The electrochemical surface areas (ECA) of these catalysts are comparable except PtRu/C-500-H. It is noteworthy that the onset potential and peak potential for CO oxidation on PtRu/C-500-H, as well as its peak current for CO oxidation, are the lowest of the various catalysts. This is likely attributed to PtRu/C-500-H having the lowest ECA of the various catalysts. It is indicated that the electrochemical active sites of PtRu/C-500-H were reduced significantly due to the agglomeration and coalescence of metal particles during the heat-treatment. On the contrary, PtRuTiO$_x$/C-500-H possesses higher peak current, lower onset and peak potential and comparable ECA to PtRu/C due to the addition of titanium oxide inhibiting the sintering of noble metal particles, which is well consistent with the results of TEM.

TABLE 1

Electrochemical characterizations for the PtRu catalyst components

| Catalyst | Onset potential (mV vs. SCE) | Peak potential (mV vs. SCE) | Peak current (mA) | ECA* ($m^2 g^{-1}$) |
|---|---|---|---|---|
| PtRu/C | 119 | 361 | 3.05 | 101.26 |
| PtRu/C-500-H | 44 | 330 | 1.03 | 43.34 |
| PtRuTiO$_x$/C | 105 | 446 | 2.73 | 114.69 |
| PtRuTiO$_x$/C-500-H | 82 | 395 | 2.67 | 99.50 |

*Assuming the charge of CO monolayer adsorption is 420 μC $cm^{-2}$

Figure 4A:
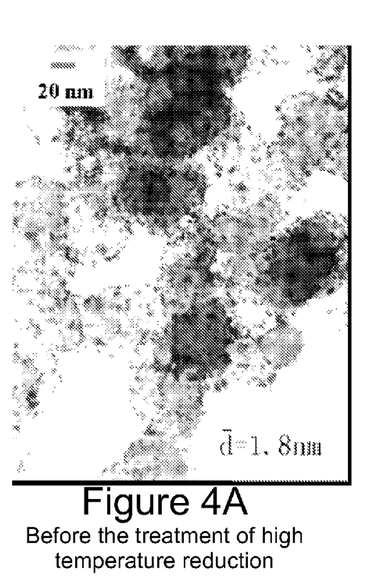
FIG. 4A is an electron microscope photo of the commercially available PtRu/C catalyst, with the same supported amount, before the reduction treatment at 500° C.
Figure 4B:
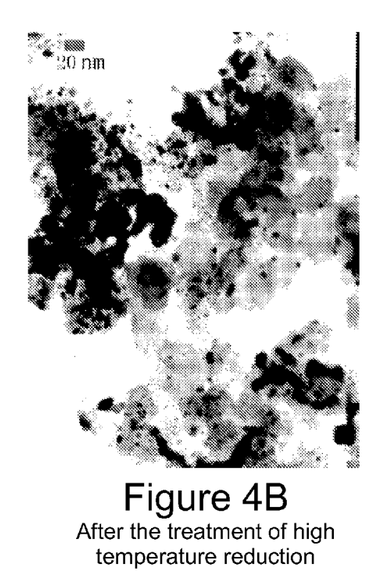
FIG. 4B is an electron microscope photo of the commercially available PtRu/C catalyst, with the same supported amount, after the reduction treatment at 500° C.

Referring now to FIG. 4A, FIG. 4A is an electron microscope photo of the commercially available PtRu/C catalyst, with the same supported amount, before the reduction treatment at 500° C. FIG. 4B is an electron microscope photo of the commercially available PtRu/C catalyst, with the same supported amount, after the reduction treatment at 500° C.

The following examples describe in detail the preparing procedure and the characterization experiment of selected embodiments in the present invention, but the present invention is not limited to the following examples or embodiments.

EXAMPLE 1

The Preparation of the platinum titanium carbon (PtTiO$_x$/C) catalyst (the mass percentage of Pt is 40 wt. %, and the atom ratio is Pt:Ti=5:1).

The charcoal black XC-72R is pretreated with 2N hydrochloric acid and 5N nitric acid solution, followed by drying at 140° C., then weigh 2 g and disperse in 100 ml isopropyl alcohol by ultrasonic for 30 min to prepare the carbon slurry. With stirring, add the ethylene glycol solution of tetrabutyl titanate (containing 482 mg tetrabutyl titanate). Then the mixture of 20 ml isopropyl alcohol+15 ml water+1 ml nitric acid was added drop wise, stir for 4 days to hydrolyze titanium thoroughly, wash with a large amount of water, and dry to obtain the complex carrier for use. The prepared 1.2 g complex carrier in 200 ml ethylene glycol is used to prepare carbon slurry by the ultrasonic for 30 min. Weigh 2.16 g chloroplatinic acid (containing 0.799 g platinum) and dissolve in 50 ml ethylene glycol, add in the carbon slurry drop wise, violently stir for 20 min, adjust the pH to 13 with 1 molar/liter sodium hydroxide/ethylene glycol solution, continue to stir for 2 hours, heat to 135° C. and incubate for 4 hours, then cool down to the room temperature, add 150 ml deionized water, adjust to pH 3 with muriatic acid, stir for 3 hours, filter and rinse, followed by vacuum drying at 80° C.

overnight. The 40 wt. % PtTiO$_x$/C catalyst is thus obtained, and the obtained catalyst is subjected to the reduction treatment under the hydrogen and argon gas mixture at 500° C. for 2 hours, that is 40 wt. % PtTiO$_x$/C-500-H; or the obtained catalyst is subjected to the thermal treatment under argon gas at 500° C. for 2 hours, that is 40 wt. % PtTiO$_x$/C-500-Ar. Both the transmission electron microscope and X ray diffraction experiment results demonstrated that the particle diameter of the catalyst metal particle is below 5.0 nanometer, and possess satisfactory dispersion degree, no agglomeration or aggregation phenomena occur.

EXAMPLE 2

The preparation of platinum titanium carbon (PtTiO$_x$/C) catalyst (the mass percentage of Pt is 40 wt. %, and the atom ratio is Pt:Ti=1:1).

With the other conditions being the same as in example 1, the atom ratio Pt to Ti in the catalytic component is changed to 1:1. The supported amount of platinum maintain as 40 wt. %. Both the transmission electron microscope and X-ray diffraction experiment results demonstrated that the metal particle diameter and distribution of the catalyst before and after the treatment are similar to those in example 1.

EXAMPLE 3

The preparation of platinum titanium carbon (PtTiO$_x$/C) catalyst (the mass percentage of Pt is 40 wt. %, and the atom ratio is Pt:Ti=10:1).

With the other conditions being the same as in example 1, the atom ratio of Pt to Ti in the catalytic component is changed to 10:1. The supported amount of platinum maintain as 40 wt. %. The transmission electron microscope and X ray diffraction experiment results demonstrated that the metal particle diameter and distribution of the catalyst before and after the treatment are similar to those in example 1.

EXAMPLE 4

The preparation of the platinum titanium carbon (PtTiO$_x$/C) catalyst (the mass percentage of Pt is 20 wt. %, and the atom ratio is Pt:Ti=5:1).

With the other conditions being the same as in example 1, the mass percentage of Pt in the catalyst components is changed to 20 wt. %. Both the transmission electron microscope and X-ray diffraction experiment results demonstrated that the particle diameter and distribution of the catalyst before and after the treatment are similar to those in example 1.

EXAMPLE 5

The preparation of the platinum ruthenium titanium carbon (PtRuTiO$_x$/C) catalyst (the mass percentage of Pt is 20 wt. %, the mass percentage of Ru is 10 wt. %, and the atom ratio is Pt:Ru:Ti=5:5:1).

Figure 1A:
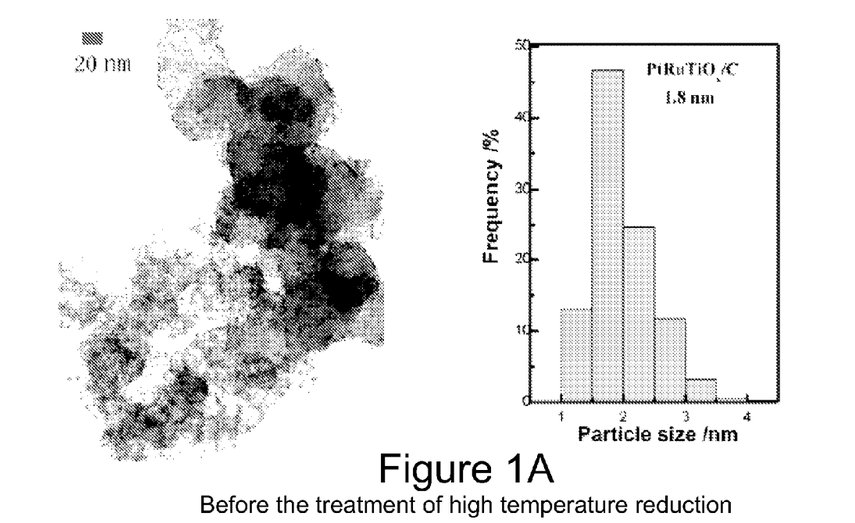
FIG. 1A includes a transmission electron microscope photo and the distribution of the particle diameter of the 30 wt. % PtRuTiO$_x$/C catalyst before the reduction treatment at 500° C., which was prepared in example 5.
Figure 1B:
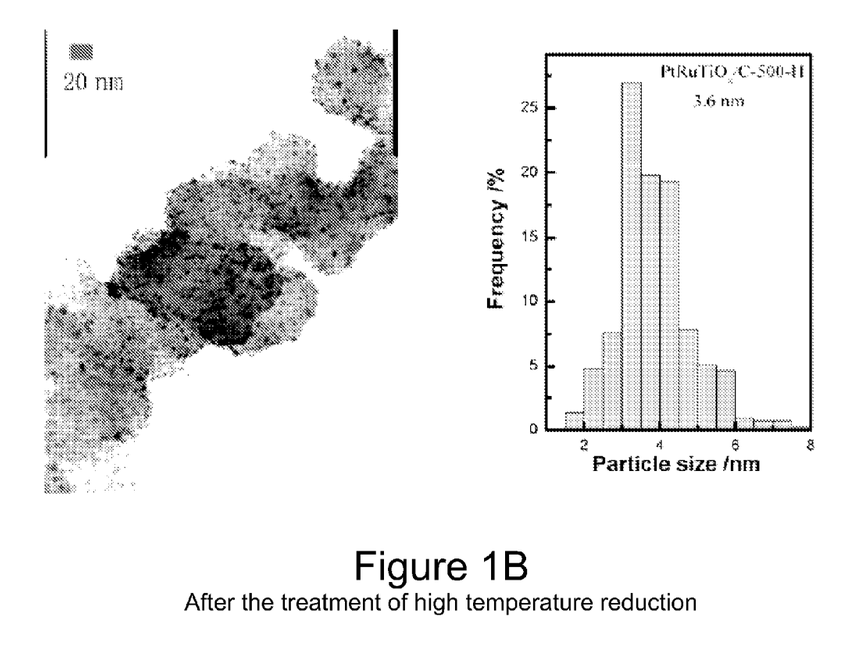
FIG. 1B includes a transmission electron microscope photo and the distribution of the particle diameter of the 30 wt. % PtRuTiO$_x$/C catalyst after the reduction treatment at 500° C., which was prepared in example 5.

The charcoal black XC-72R is pretreated with the 2N hydrochloric acid and 5N nitric acid solution, followed by drying at 140° C. Weigh 2 g and disperse in 100 ml isopropyl alcohol by ultrasonic for 30 min to prepare the carbon slurry. With stirring, add the ethylene glycol solution of tetrabutyl titanate (containing 516 g tetrabutyl titanate). Then the mixture comprising 20 ml isopropyl alcohol, 15 ml water, and 1 ml nitric acid are added dropwise, stir for 4 days to hydrolyze titanium thoroughly, rinse with a large amount of water, dry to obtain the complex carrier for use. The prepared 1.4 g complex carrier in 200 ml ethylene glycol is used to obtain carbon slurry by the ultrasonic for 30 min. Weigh 1.08 g chloro platinic acid (containing 0.400 g platinum) and 0.54 g ruthenium trichloride (containing 0.200 g ruthenium), dissolve in 50 ml ethylene glycol to prepare the platinum ruthenium mixture solution, add into the carbon slurry drop wise, violently stir for 20 min, adjust the pH value to 13 with 1 molar/liter sodium hydroxide/ethylene glycol solution, continue to stir for 2 hours, heat to 135° C. and incubate for 4 hours, then cool down to the room temperature, add 150 ml deionized water, adjust to pH 3 with muriate acid, stir for 3 hours, filter and rinse, followed by vacuum drying at 80° C. overnight. The 20 wt. % Pt-10 wt. % RuTiO$_x$/C catalyst is thus obtained, and the obtained catalyst is subjected to the reduction treatment with the hydrogen and argon gas mixture at 500° C. for 2 hours, that is 20 wt. % Pt-10 wt. % RuTiO$_x$/C-500-H, or the obtained catalyst is subjected to the thermal treatment under argon gas at 500° C. for 2 hours, that is 20 wt. % Pt-10 wt. % RuTiO$_x$/C-500-Ar. Both the transmission electron microscope and X-ray diffraction experiment results demonstrated that the average particle diameters of the catalyst metal particles before and after treatment were below 4.0 nanometers, and possess a satisfactory dispersion degree and no agglomeration or aggregation phenomena occurred. FIG. 1A includes a transmission electron microscope photo and the distribution of the particle diameter of the 30 wt. % PtRuTiO$_x$/C catalyst before the reduction treatment at 500° C., which was prepared in example 5. FIG. 1B includes a transmission electron microscope photo and the distribution of the particle diameter of the 30 wt. % PtRuTiO$_x$/C catalyst after the reduction treatment at 500° C., which was prepared in example 5.

EXAMPLE 6

The preparation of the platinum ruthenium titanium carbon (PtRuTiO$_x$/C) catalyst (the mass percentage of Pt is 20 wt. %, the mass percentage of Ru is 10 wt. %, and the atom ratio is Pt:Ru:Ti=1:1:1).

With the other conditions being the same as in example 5, the atom ratio of Pt to Ti in the catalyst components is changed to 1:1. The supported amount of platinum and ruthenium metals are maintained at 20 wt. % and 10 wt. %, respectively. Both the transmission electron microscope and X-ray diffraction experiment results demonstrated that the metal particle diameters and distribution of the catalyst before and after treatment are similar to those in example 5.

EXAMPLE 7

The preparation of the platinum ruthenium titanium carbon (PtRuTiO$_x$/C) catalyst (the mass percentage of Pt is 20 wt. %, the mass percentage of Ru is 10 wt. %, and the atom ratio is Pt:Ru:Ti=10:10:1).

With the other conditions being the same as in example 5, the atom ratio of Pt to Ti in the catalyst components is changed to 10:1. The supported amount of platinum and ruthenium metals maintain as 20 wt. % and 10 wt. %. Both the transmission electron microscope and X-ray diffraction experiment results demonstrated that the metal particle diameters and distribution of the catalyst before and after treatment are similar to those in example 5.

EXAMPLE 8

The preparation of the platinum ruthenium titanium carbon (PtRuTiO$_x$/C) catalyst (the mass percentage of Pt is 30 wt. %, the mass percentage of Ru is 15 wt. %, and the atom ratio is Pt:Ru:Ti=5:5:1).

With the other conditions being the same as in example 5, the metal supported amount of Pt and Ru is changed to 30 wt. % and 15 wt. %. Both the transmission electron microscope and X-ray diffraction experiment results demonstrated that the metal particle diameters and distribution of the catalyst before and after treatment are similar to those in example 5.

EXAMPLE 9

The preparation of the platinum ferrum titanium carbon (PtFeTiO$_x$/C) catalyst (the mass percentage of Pt is 40 wt. %, and the atom ratio is Pt:Fe:Ti=5:1:1).

With the other conditions being the same as in example 1, the components in the catalyst is changed to Pt and Fe, in which the supported amount of the noble metal is 40 wt. %, and the atom ratio is Pt:Fe:Ti=5:1:1. Both the transmission electron microscope and X-ray diffraction experiment results demonstrated that the metal particle diameters and distribution of the catalyst before and after treatment are similar to those in example 1.

EXAMPLE 10

The preparation of the platinum cobalt titanium carbon (PtCoTiO$_x$/C) catalyst (the mass percentage of Pt is 40 wt. %, and the atom ratio is Pt:Co:Ti=5:1:1).

With the other conditions being the same as in example 1, the components in the catalyst is changed to Pt and Co, in which the supported amount of the noble metal is 40 wt. %, and the atom ratio is Pt:Co:Ti=5:1:1. Both the transmission electron microscope and X-ray diffraction experiment results demonstrated that the metal particle diameter and distribution of the catalyst before and after treatment are similar to those in example 1.

EXAMPLE 11

The preparation of the platinum chromium titanium carbon (PtCrTiO$_x$/C) catalyst (the mass percentage of Pt is 40 wt. %, and the atom ratio is Pt:Cr:Ti=5:1:1).

With the other conditions being the same as in example 1, the components in the catalyst is changed to Pt and Cr, in which the supported amount of the noble metal is 40 wt. %, and the atom ratio is Pt:Cr:Ti=5:1:1. Both the transmission electron microscope and X-ray diffraction experiment results demonstrated that the metal particle diameter and distribution of the catalyst before and after treatment are similar to those in example 1.

EXAMPLE 12

The preparation of the platinum titanium carbon nano tube (PtTiO$_x$/CNTs) (the mass percentage of Pt is 40 wt. %, and the atom ratio is Pt:Ti=5:1).

With the other conditions being the same as thatin example 1, the carrier carbon black XC-72R is changed to the carbon nano tube. Both the transmission electron microscope and X-ray diffraction experiment results demonstrated that the metal particle diameters and distribution of the catalyst before and after treatment are similar to those in example 1.

EXAMPLE 13

The preparation of the platinum titanium (Pt/TiO$_x$) catalyst (the atom ratio is Pt:Ti=5:1).

With stirring, the mixture of isopropyl alcohol, water and nitric acid is added dropwise into the ethylene glycol solution of tetrabutyl titanate (containing 964 mg of tetrabutyl titanate) to hydrolyze titanium thoroughly. Weigh 4.32 g chloro platinic acid (containing 1.598 g platinum) and dissolve into 100 ml ethylene glycol, then it is added dropwise to the above described hydrolytic solution, violently stir for 20 min, adjust the pH to 13 with 1 molar/liter sodium hydroxide/ethylene glycol solution, continue to stir for 2 hours, then heat to 135° C. and incubate for 4 hours, then cool down to the room temperature, and add 150 ml deionized water, and adjust the pH to 3 with muriate acid, stir for 3 hours, then filter and rinse, followed by vacuum drying at 80° C. overnight. The Pt/TiO$_x$ catalyst is thus obtained; the prepared catalyst is subjected to the reduction treatment under the hydrogen argon gaseous mixture at 500° C. for 2 hours, that is Pt/TiO$_x$-500-H or the obtained catalyst is subjected to the thermal treatment under argon gas at 500° C. for 2 hours, that is Pt/TiO$_x$-500-Ar. Both the transmission electron microscope and X-ray diffraction experiment results demonstrated that the metal particle diameter and distribution of the catalyst before and after treatment are similar to those in example 1.

EXAMPLE 14

The preparation and performance test of the direct methanol fuel cell.

Figure 2:
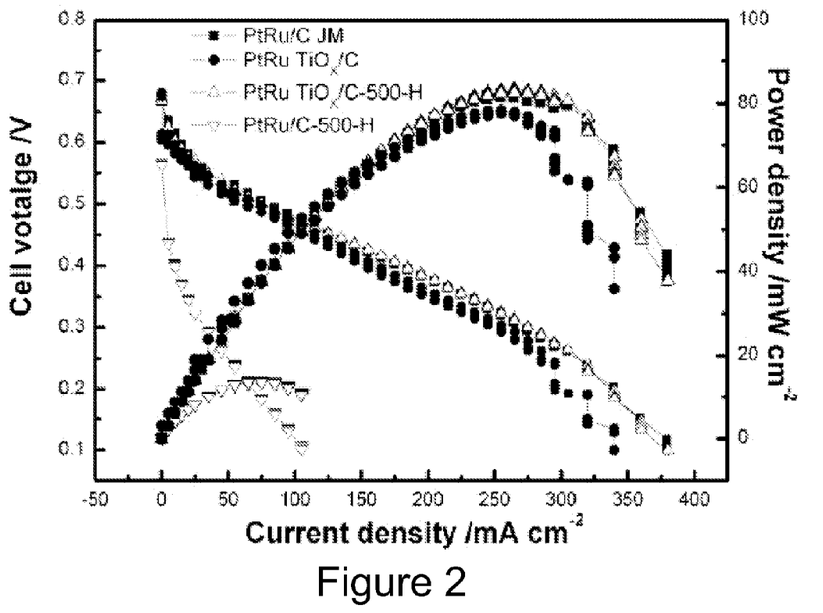
FIG. 2 illustrates the performance comparison between commercially available catalysts and the catalyst prepared in example 5, which was used as the anode electrocatalyst for the direct methanol fuel cells.

The platinum ruthenium based (PtRuTiO$_x$/C) catalyst prepared in example 5-8 and commercially available catalyst are employed as the anode catalyst, Nafion®-115 perfluorosulfonic acid membrane is employed as the electrolyte, and the commercially available 20 wt. % Pt/C catalyst from Johnson-Matthey Company (JM) is employed as the cathode to assemble the half cell for the discharge test. When the discharge performance of the cell is in the steady state, the polarization (IV) curve of the cell is measured. FIG. 2 illustrates the performance comparison between commercially available catalysts and the catalyst prepared in example 5, which was used as the anode electrocatalyst for the direct methanol fuel cells.

EXAMPLE 15

The lifecycle and performance test of the direct methanol fuel cell.

Figure 3:
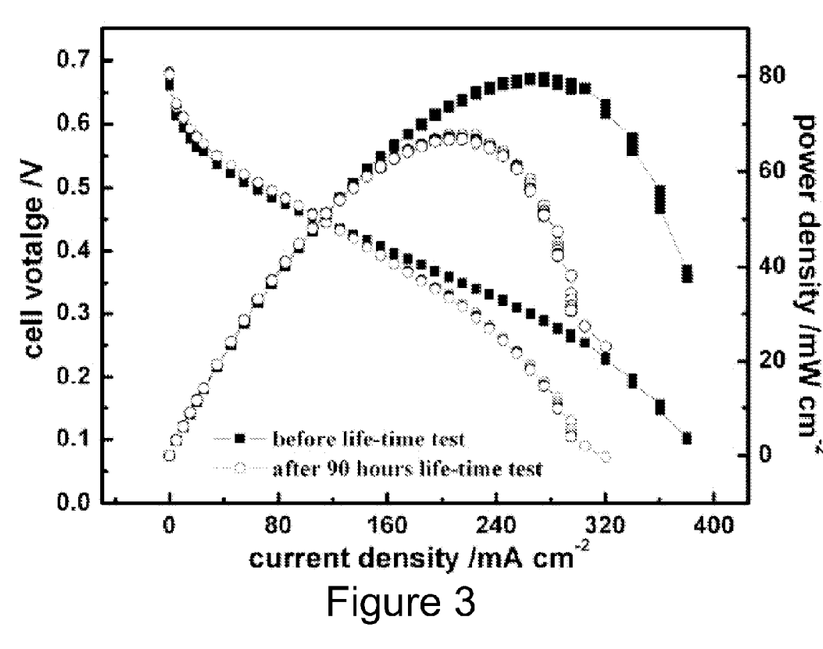
FIG. 3 illustrates the performance comparison of the PtRu-TiO$_x$/C-500-H catalyst before and after constant current discharge at 100 mA cm$^{-2}$ for 90 hours, which was prepared in example 5 and used as the anode electrocatalyst for the direct methanol fuel cells.

The structure and performance test of the cell are the same as in example 14. The lifecycle test is the routine constant current discharge experiment. The condition of the lifecycle experiment is as follows: the cell temperature is 75° C.; the 1 molar/liter methanol solution is transported from the anode side, and the oxygen from the cathode side, the pressure is 0.2 MPa; the cell discharge is performed with the constant current condition of 100 mA cm$^{-2}$, the change of the voltage as the change of time during the discharge period is recorded. Monitor the change of the internal resistance of cell during the discharge period as well as the change of the cell performance at different discharge time. FIG. 3 presents the performance comparison before and after the 90 hour lifecycle test. As shown in FIG. 3, after the 90 hour lifecycle test, the electrochemical activity did not basically reduce, the voltage at 100 mA cm$^{-2}$ decreased from 475 mV before the lifecycle test to 466 mV after the lifecycle test. In regard to other characters during the lifecycle test, it could be presumed that the decrease in the latter's performance is attributable to an increase in the internal resistance of cell and a structure change in erosion. The catalyst in the present invention presented desirable performance stability of the cell lifecycle.

EXAMPLE 16

The characterization of the electric field stability of the catalyst in routine three-electrode system under acidic conditions.

Figure 5:
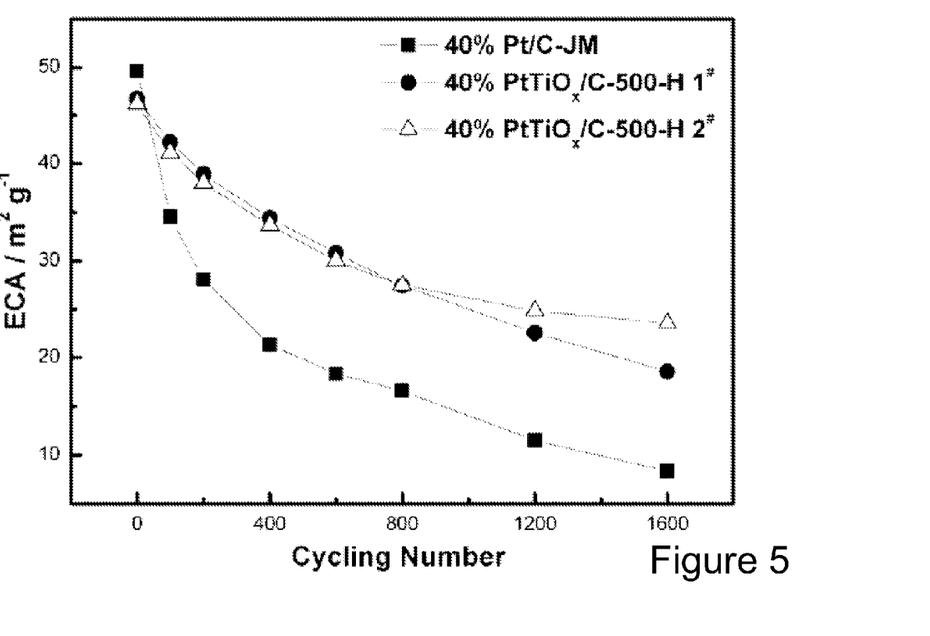
FIG. 5 is a the change curve of the change in electrochemical active surface area with the number of cycles (cycling number); the electrochemical active surface area of the catalyst after different aging turns was determined using the cyclic voltammetry method, and the prepared electrocatalyst and corresponding commercially available catalyst were treated with the electrochemical accelerated scan aging using the rotating disk electrode.

The Pt based or PtRu based catalyst prepared in the above described examples are used to prepare the thin film electrodes, the routine three-electrode system is employed, the stability of the catalyst is characterized using the rotating disk electrode. The thin film electrodes are prepared on the glassy carbon electrode, in the 1.0 molar/liter perchloric acid electrolyte, the electric field stability test is done using electrochemical rapid scanning. Weigh 5.0 mg catalyst, and add I ml ethanol solution, disperse by the ultrasonic, then add 50 µl Nafion®  solution, and continue to treat by the ultrasonic for 10 min. Using the 25 µl scale micrometre syringe, spread slowly 25 µl of the above described slurry to the glassy carbon electrode in multiple steps, under the irradiation of infrared rays, volatilize thoroughly with ethanol. Install the disc electrode coated with the catalyst sample to the 616RDE device, place the glassy carbon electrode in the perchloric acid solution, and connect to the M273A constant electric potential/constant electric current meter. Set the initial electric potential to −0.24V (vs. SCE), and then return the potential to 1.20V (vs. SCE), the scanning speed 100 mV s$^{-1}$, scan different turns. Record the change of the electrochemical active surface area of catalyst before and after rapid scanning. FIG. 5 is a the change curve of the change in electrochemical active surface area of the prepared and commercially available catalyst with the number of cycles (cycling number); the electrochemical active surface area of the catalyst after different aging turns was determined using the cyclic voltammetry method, and the prepared electrocatalyst and corresponding commercially available catalyst were treated with the electrochemical accelerated scan aging using the rotating disk electrode. The catalysts present in this invention show better stability toward electric field than the commercial catalyst.

EXAMPLE 17

The preparation and performance test of the hydrogen oxygen fuel cell.

The Pt based catalyst and commercially available catalyst before and after the treatment are used as the cathode catalyst for the hydrogen oxygen fuel cells, Nafion®-212 perfluorosulfonic acid membrane is employed as the electrolyte, and the commercially available 40 wt. % Pt/C catalyst from Johnson-Matthey Company (JM) is employed as the anode to perform the discharge test. When the discharge performance of the cell is in a steady state, the polarization (IV) curve of the cell is measured. The performances of the catalyst before and after the treatment are better or comparable to those of the commercially available catalysts with the same supported amount.

EXAMPLE 18

The spot electrochemical aging experiment of the hydrogen oxygen fuel cells.

The structure and performance of the cell is the same as in example 17, the deionized water is transported to the cathode side of the tested electrode in the spot aging experiment, and the hydrogen for humidification is transported to the cathode side, which double as the reference electrode and counter electrode, the humidification temperature is 5-10° C. higher than the cell temperature, the initial electric potential for scanning is 0.0V (vs. DHE), the return potential is 1.0V (vs. DHE), the scanning speed is 100 mV s$^{-1}$. The change of discharge performance of the catalyst before and after the rapid scanning were recorded. The results demonstrated that the Pt-based catalyst subjected to the treatment of high temperature presents more preferable stability in the same experiment condition.

EXAMPLE 19

The lifecycle and performance test without external humidification of the hydrogen oxygen fuel cell.

Figure 6:
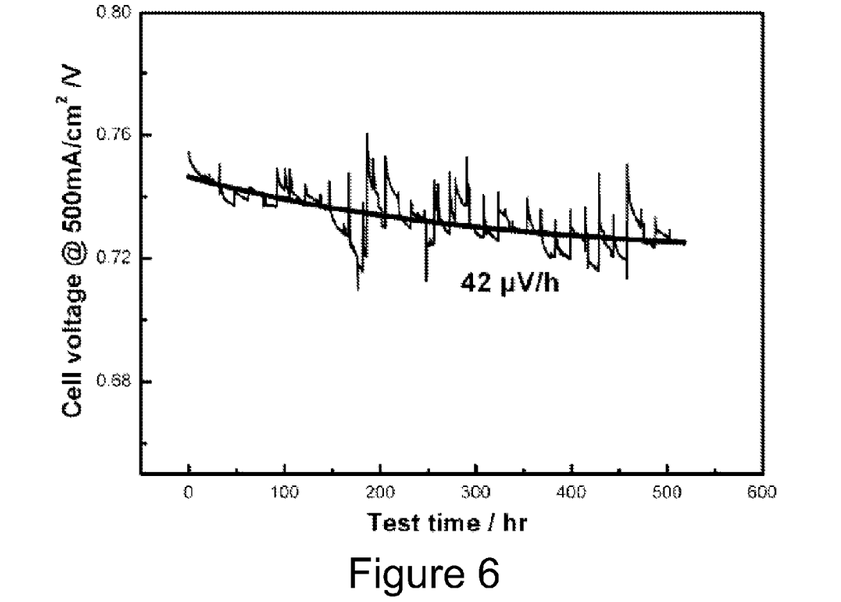
FIG. 6 shows the variation of the cell voltage with the test time using PtTiO$_x$/C-500-Ar as cathode and anode electrocatalysts under constant current discharge at 500 mA cm$^{-2}$. The cell was operated intermittently (running around 14 hours and kept at open circuit voltage (OCV) around 10 hours for every cycle) without external humidification at 60° C. under the back pressure of 2.0 atm. The flow rates of oxygen and hydrogen were 30 and 20 ml min$^{-1}$, respectively.
Figure 7:
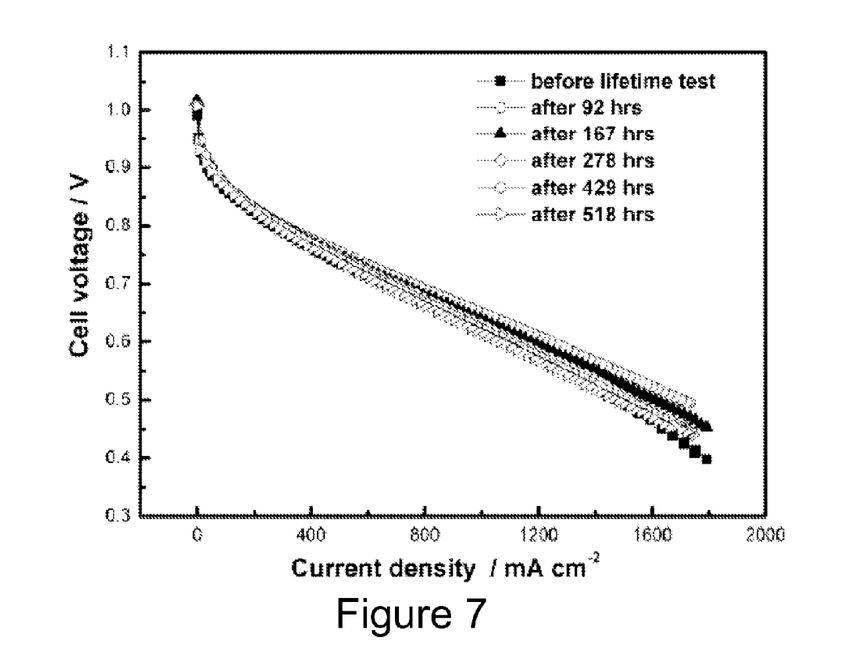
FIG. 7 shows the polarization curves of the single fuel cell at different test times during the lifetime test. The cell was operated without external humidification at 60° C. under the back pressure of 2.0 atm. The flow rate of oxygen and hydrogen were 60 and 60 ml min$^{-1}$, respectively.

The structure and performance test of the cell are the same as in example 17. Use Pt-based catalyst in invention anode and cathode electrocatalysts. The lifecycle test is the routine constant current discharge experiment. The condition of the lifecycle experiment is as follows: the cell temperature is 60° C.; the hydrogen without external humidification is transported from the anode side, and the oxygen without external humidification from the cathode side; the pressure is 0.2 MPa; the cell discharge is performed with the constant current condition of 500 mA/cm$^2$, the change of the voltage as the change of time during the discharge period is recorded. Monitor the change of the internal resistance and electrochemical surface area of catalyst of cell during the discharge period as well as the change of the cell performance at different discharge times. FIG. 6 is a graph of the change of cell voltage over time of the cell using PtTiO$_x$/C-500-Ar as anode and cathode catalyst. FIG. 7 is a graph of the performance comparison at different test times during lifecycle test. The results demonstrated that the cell can be stably operated without external humidification using PtTiO$_x$/C-500-Ar as anode and cathode catalyst due to the ability of water retention of titanium oxide; the catalyst presents excellent stability in the lifecycle test.

COMPARATIVE EXAMPLE 1

The comparison between the catalysts modified with the titanium oxides and the unmodified commercially available catalysts.

With the same metal supported amount, the catalyst is subjected to the treatment of high temperature. The catalyst modified with titanium oxides presents excellent thermal stability, with very little increase of particle diameter and even distribution degree. Furthermore, comparing with the commercially available catalyst, no agglomeration or aggregation occurs. Additionally, the catalyst subjected to the treatment of high temperature presents desirable electric field stability in the acidic environment. These characteristics caused its stability to significantly increase in the cell performance environment.

COMPARATIVE EXAMPLE 2

The comparison of the lifecycle between the catalyst in the present invention and the catalysts in the literature reported:

Comparing with the PtRu/C catalyst used as the anode electrocatalyst for the direct methanol fuel cells in the literature (Jianguo Liu et al., Phys. Chem. Chem. Phys, 6 (2004)

134), with the same electrode structure and the same operating conditions, the half cell that used the catalyst in the present invention presents better stability than that of the commercially available catalysts in the lifecycle test. After a lifecycle test for 90 hours, the cell voltage at 100 mA cm$^{-2}$ current density point just decreased to 466 mV from an initial 475 mV; furthermore, the lifecycle test was only performed for 75 hours in the literature, but the cell voltage at 100 mA cm$^{-2}$ current density point decreased to 350 mV from an initial 420 mV.

The above description of embodiments of the invention is merely exemplary in nature and, thus, variations thereof are not to be regarded as a departure from the scope of the invention.

What is claimed is:

1. A product comprising:
    an electrocatalyst for a proton exchange membrane fuel cell, comprising a porous electrically conductive material that supports at least one of PtTiO$_x$, PtRuTiO$_x$, PtFeTiO$_x$, PtCoTiO$_x$, or PtCrTiO$_x$, wherein the atom ratio of platinum to titanium is 0.01-99, the atom ratio of platinum to ruthenium, iron, cobalt, or chromium is 0.01-99, and the particle diameter of the platinum is 1-20 nm.

2. A product as set forth in claim 1 wherein the porous electrically conductive material comprises at least one of activated carbon, carbon nano tube, carbon fiber, mesoporous carbon, carbosphere, or electrically conductive macromolecule, and wherein the specific surface area of that material is 10-2000 m$^2$ g$^{-1}$.

3. A product as set forth in claim 1, wherein the atom ratio of platinum to titanium is between 1:1 to 10:1.

4. A method for preparing an electrocatalyst comprising:
    mixing a titanium precursor and a carrier in a solvent;
    hydrolyzing the titanium precursor to form a complex carrier modified with titanium oxide; wherein the titanium precursor comprises at least one of an alkoxide or inorganic salt of titanium;
    absorbing a precursor of an active catalyst component to the complex carrier,
    obtaining the electrocatalyst by the reduction of the precursor of the active catalyst component; wherein the precursor of the active component comprises at least one of a chloride or nitrate; the reduction being accomplished using a reducing agent comprising at least one of ethylene glycol, H$_2$, HCHO, NaBH$_4$, NaS$_2$O$_4$, or HCOOH;
    heating the electrocatalyst under a reductive gas atmosphere or inert gas atmosphere at 300-900° C. for 0.5-10 hours.

5. A method as set forth in claim 4, further comprising adding one or more of the transitional metals or transitional metal oxides as the active component, wherein said transitional metal comprises at least one of Sc, Ti, V, Cr, Mn, Fe, Co, Ni, Cu, lanthanides or actinides.

6. A method as set forth in claim 4, wherein the absorbing comprises multiple steps or simultaneous adsorption.

7. A method as set forth in claim 4, wherein the reductive gas atmosphere comprises H$_2$/Ar gaseous mixture, wherein the concentration of H$_2$ is 10-90% vol. %.

8. A method as set forth in claim 4, wherein the inert gas atmosphere comprises Ar, N$_2$, or He.

9. A method as set forth in claim 4, wherein said active catalyst component comprises Pt or PtRu.

10. A method for preparing an electrocatalyst comprising:
    mixing a carbon carrier and a solvent to form a suspension;
    adding an alkoxide of titanium to the suspension;
    hydrolyzing the alkoxide of titanium to form a complex carbon carrier modified with titanium oxide;
    absorbing a platinum precursor component onto the complex carrier modified with titanium oxide;
    obtaining an electrocatalyst which comprises platinum supported on the complex carrier modified with titanium oxide by reducing the platinum precursor component with a reducing agent;
    heating the electrocatalyst under a reductive gas atmosphere or inert gas atmosphere at 300-900° C. for 0.5-10 hours.

11. A method as set forth in claim 10, wherein the solvent comprises isopropyl alcohol and the alkoxide of titanium comprises tetrabutyl titanate.

12. A method as set forth in claim 10, wherein the platinum precursor component comprises chloroplatinic acid.

13. A method as set forth in claim 10, wherein the reducing agent comprises ethylene glycol.

14. A method as set forth in claim 10, wherein heating the electrocatalyst comprises heating the electrocatalyst in a reductive atmosphere of 10 vol. % H$_2$ and the balance Ar.

* * * * *